United States Patent
Kao

(10) Patent No.: US 12,254,093 B2
(45) Date of Patent: Mar. 18, 2025

(54) COMPUTER BOOT METHOD AND SYSTEM

(71) Applicant: GIGAIPC CO., LTD., New Taipei (TW)

(72) Inventor: Chin Jun Kao, New Taipei (TW)

(73) Assignee: GIGAIPC CO., LTD., New Taipei (TW)

( * ) Notice: Subject to any disclaimer, the term of this patent is extended or adjusted under 35 U.S.C. 154(b) by 91 days.

(21) Appl. No.: 18/240,236

(22) Filed: Aug. 30, 2023

(65) Prior Publication Data

US 2024/0378296 A1 Nov. 14, 2024

(30) Foreign Application Priority Data

May 12, 2023 (TW) ................................. 112117616

(51) Int. Cl.
*G06F 21/57* (2013.01)
(52) U.S. Cl.
CPC .................................. *G06F 21/575* (2013.01)
(58) Field of Classification Search
CPC ..................................................... G06F 21/575
See application file for complete search history.

(56) References Cited

U.S. PATENT DOCUMENTS

| 10,084,771 B2* | 9/2018 | Kocher ................. H04L 9/0897 |
| 2010/0135486 A1* | 6/2010 | Schneider ............ H04L 9/0637 380/46 |
| 2013/0227263 A1* | 8/2013 | Kim ....................... G06F 21/602 713/2 |
| 2015/0149753 A1* | 5/2015 | Huang ................. G06F 11/2289 713/2 |

FOREIGN PATENT DOCUMENTS

| TW | I621031 B | 4/2018 |
| WO | 2017/133559 A1 | 8/2017 |

OTHER PUBLICATIONS

TW Office Action dated Sep. 19, 2023 as received in Application No. 112117616.

* cited by examiner

*Primary Examiner* — Zahid Choudhury
(74) *Attorney, Agent, or Firm* — Maschoff Brennan

(57) ABSTRACT

A computer boot method, performed by a processing device includes: reading a first bit string in a predetermined data block from a target device, performing a bit rotation in a first direction on the first bit string according to a first default bit count to generate a second bit string, obtaining a third bit string associated with a prestored bit string, determining whether a to-be-verified parameter of the second bit string matches the third bit string, authorizing the target device to perform a boot procedure when the to-be-verified parameter of the second bit string matches the third bit string, and not authorizing the target device to perform the boot procedure when the to-be-verified parameter of the second bit string does not match the third bit string.

16 Claims, 6 Drawing Sheets

COMPUTER BOOT METHOD AND SYSTEM

CROSS-REFERENCE TO RELATED APPLICATIONS

This non-provisional application claims priority under 35 U.S.C. § 119(a) on Patent Application No(s). 112117616 filed in Republic of China (ROC) on May 12, 2023, the entire contents of which are hereby incorporated by reference.

BACKGROUND

1. Technical Field

This disclosure relates to a computer boot method and system.

2. Related Art

Generally, during a boot procedure of a computer system, a boot device installed or connected thereto is scanned. The boot device stores boot files needed for the boot procedure, and the computer system may use the boot files to activate an operating system of the computer system.

However, in some scenarios, the boot device is connected externally to the computer system. Therefore, it is easy for malicious individuals to tamper with the boot files in the boot device, or to store virus into the boot device, which will cause failure to the boot procedure of the computer system or data leak.

SUMMARY

Accordingly, this disclosure provides a computer boot method and system.

According to one or more embodiment of this disclosure, a computer boot method, performed by a processing device, includes: reading a first bit string in a predetermined data block from a target device; performing a bit rotation in a first direction on the first bit string according to a first default bit count to generate a second bit string; obtaining a third bit string associated with a prestored bit string; determining whether a to-be-verified parameter of the second bit string matches the third bit string; authorizing the target device to perform a boot procedure when the to-be-verified parameter of the second bit string matches the third bit string; and not authorizing the target device to perform the boot procedure when the to-be-verified parameter of the second bit string does not match the third bit string.

According to one or more embodiment of this disclosure, a computer boot system includes: a memory device and a processing device. The memory device is configured to store a prestored bit string and a plurality of commands. The processing device is connected to the memory device and configured to read the plurality of commands to perform: reading a first bit string in a predetermined data block from a target device; performing a bit rotation in a first direction on the first bit string according to a first default bit count to generate a second bit string; obtaining a third bit string associated with the prestored bit string; determining whether a to-be-verified parameter of the second bit string matches the third bit string; authorizing the target device to perform a boot procedure when the to-be-verified parameter of the second bit string matches the third bit string; and not authorizing the target device to perform the boot procedure when the to-be-verified parameter of the second bit string does not match the third bit string.

In view of the above description, the computer boot method and system according to one or more embodiments of the present disclosure may allow the target device performing the boot procedure after confirming that the target device is the previously authorized boot device, thereby avoiding virus infection occurs on the computer system as well as avoiding data leak of the computer system. Therefore, only the authorized boot device may activate boot mechanism. In addition, the above embodiment is compatible with current secure boot mechanism of existing operating systems.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
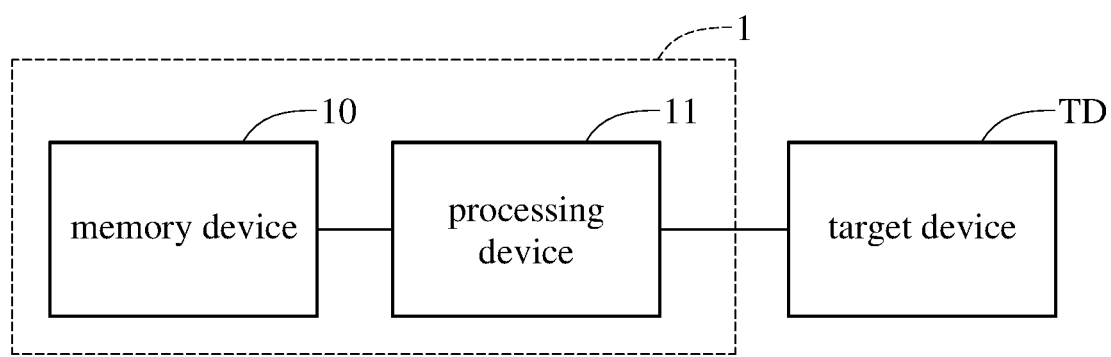
FIG. 1 is a block diagram illustrating a computer boot system and a target device according to an embodiment of the present disclosure.

Please refer to FIG. 1, wherein FIG. 1 is a block diagram illustrating a computer boot system and a target device according to an embodiment of the present disclosure. As shown in FIG. 1, the computer boot system 1 includes a memory device 10 and a processing device 11. The memory device 10 is electrically connected to or in communication connection with the processing device 11, and the processing device 11 is electrically connected to or in communication connection with a target device TD. The memory device 10 and the processing device 11 may be disposed in a computer system, and the target device TD may be connected to the computer system. The target device TD is, for example, a hardware device for storing data, such as a hard disk, CD, flash drive or portable storage device etc.

The memory device 10 is configured to store a prestored bit string and a plurality of commands. The memory device 10 may be a non-volatile memory (NVM), such as a read-only memory (ROM), a flash memory and/or a non-volatile random-access memory (NVRM) etc. It should be noted that the bit string described in this disclosure represents a string formed by concatenating multiple bytes.

The processing device 11 is configured to read the commands of the memory device 10 to perform the computer boot method according to one or more embodiments of the present disclosure to determine whether to authorize the target device TD performing the boot procedure. The processing device 11 may include one or more processors, said processor is, for example, a central processing unit, a graphics processing unit, a microcontroller, a programmable logic controller or any other processor with signal processing function.

Figure 2:
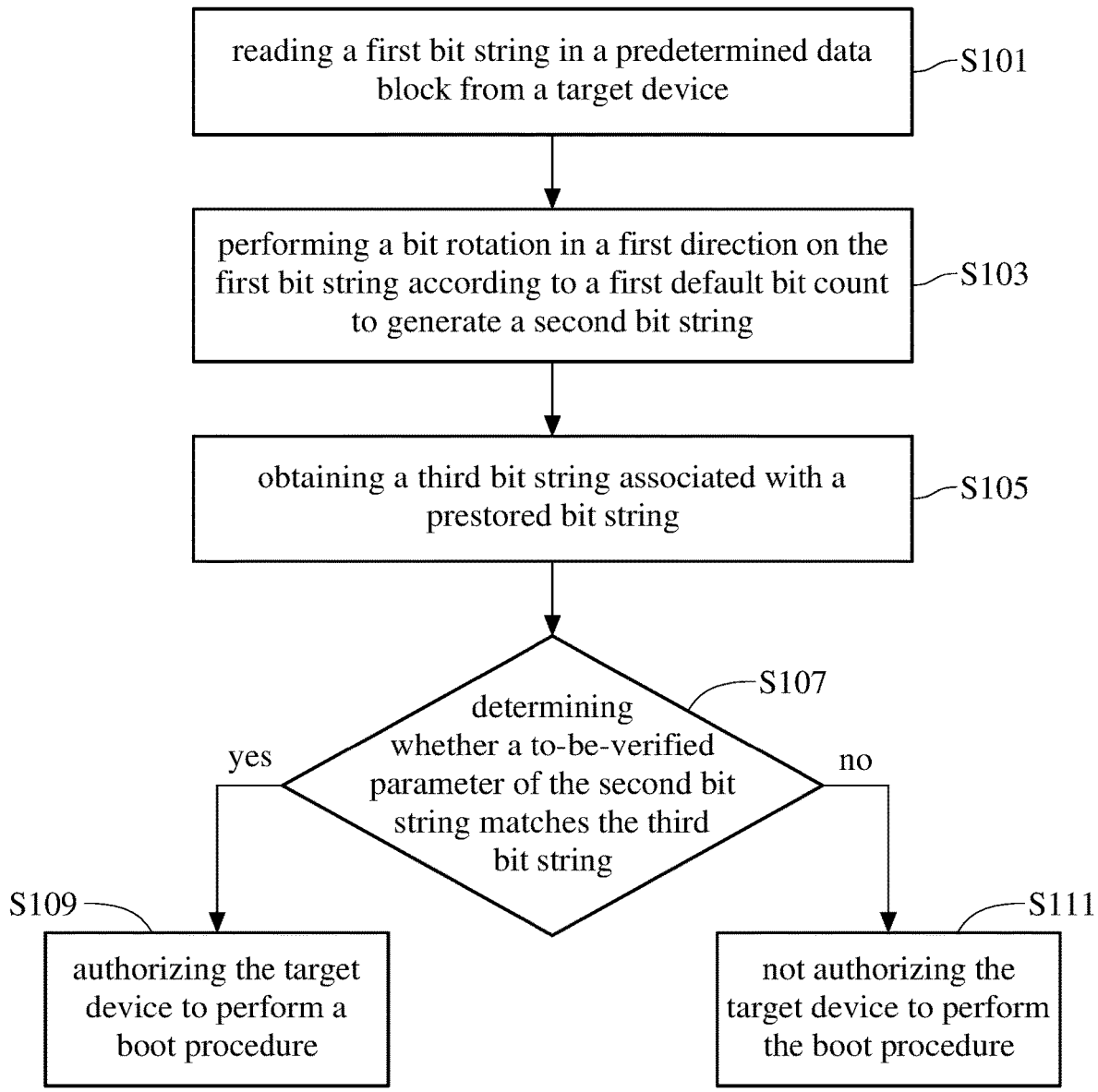
FIG. 2 is a flowchart illustrating a computer boot method according to an embodiment of the present disclosure.

Please refer to FIG. 1 and FIG. 2, wherein FIG. 2 is a flowchart illustrating a computer boot method according to an embodiment of the present disclosure. Steps shown in FIG. 2 are performed by the processing device 11. The steps shown in FIG. 2 are adapted to scenarios where the computer system with the processing device 11 disposed therewithin is powered on and before performing booting according to the boot files of the boot device. In short, the steps shown in FIG. 2 may be used to determine whether to authorize the target device TD to be the boot device performing the boot procedure. As shown in FIG. 2, the computer boot method includes: step S101: reading a first bit string in a predetermined data block from a target device; step S103: performing a bit rotation in a first direction on the first bit string according to a first default bit count to generate a second bit string; step S105: obtaining a third bit string associated with a prestored bit string; step S107: determining whether a to-be-verified parameter of the second bit string matches the third bit string; if the determination result of step S107 is "yes", performing step S109: authorizing the target device to perform a boot procedure; and if the determination result of step S107 is "no", performing step S111: not authorizing the target device to perform the boot procedure.

In step S101, the processing device 11 reads the first bit string stored in the predetermined data block of the target device TD. The processing device 11 may read the first bit string through a basic input/output system (BIOS). The predetermined data block is an idle block in the target device TD, such as a block from bit 0x1B4 to bit 0x1B7, the present disclosure is not limited thereto.

In step S103, the processing device 11 performs the bit rotation on the first default bit count in the first direction with the first default bit count to generate the bit-rotated second bit string. The first default bit count is, for example, 2 bits. The first direction may be a left direction or a right direction, the present disclosure is not limited thereto.

In step S105, the processing device 11 reads the prestored bit string from the memory device 10, and obtains the third bit string according to the prestored bit string. For example, the processing device 11 may use the prestored bit string as the third bit string.

In step S107, the processing device 11 compares the second bit string with the third bit string to determine if the two match with each other. For example, the processing device 11 may determine whether bytes of the to-be-verified parameter of the second bit string and bytes of the third bit string are the same, respectively.

When the to-be-verified parameter of the second bit string matches with the third bit string, it means that the first bit string is generated according to the prestored bit string. Therefore, the processing device 11 performs step S109 to authorize the target device TD to perform the boot procedure on the computer system disposed with the processing device 11. In another embodiment, if the prestored bit string is directly used as the third bit string, then in step S105, the processing device 11 reads the prestored bit string from the memory device 10 and uses the prestored bit string as the third bit string; in step S107, the second bit string to be verified may be the prestored bit string, the processing device 11 performing comparison between the second bit string and the third bit string may be regarded as the processing device 11 determining whether the second bit string and the prestored bit string are the same. In other words, the first bit string described in step S103 might be a bit string obtained by performing the bit rotation on the prestored bit string in an opposite direction of the first direction according to the first default bit count.

On the contrary, when the to-be-verified parameter of the second bit string and the third bit string do not match with each other, it means that the first bit string is not generated according to the prestored bit string. Therefore, the processing device 11 performs step S111 of not authorizing the target device TD to perform the boot procedure on the computer system disposed with the processing device 11.

For example, the first bit string obtained by the processing device 11 in step S101 is (Ya; Ma; K1a; K2a); the second bit string obtained by the processing device 11 by performing the bit rotation according to the first default bit count in step S103 is (Y; M; K1; K2), wherein the to-be-verified parameter is (K1; K2); the third bit string obtained by the processing device 11 according to the prestored bit string in step S105 is (K1b; K2b); the processing device 11 determines whether the to-be-verified parameter K1 and K2 of the second bit string matches with K1b and K2b of the third bit string respectively in step S107. If the to-be-verified parameter K1 and K2 of the second bit string matches with K1b and K2b of the third bit string respectively, it means that the first bit string (Ya; Ma; K1a; K2a) is generated according to the prestored bit string corresponding to the third bit string (K1b; K2b), and the processing device 11 performs step S109; if the to-be-verified parameter K1 and K2 of the second bit string do not match with K1b and K2b of the third bit string, it means that the first bit string (Ya; Ma; K1a; K2a) is not generated according to the prestored bit string corresponding to the third bit string (K1b; K2b), and the processing device 11 performs step S111.

Through the above embodiment, the target device TD may be allowed to perform the boot procedure after the target device TD is confirmed as the previously authorized boot device, thereby avoiding virus infection occurs on the computer system as well as avoiding data leak of the computer system. Therefore, only the authorized boot device may activate boot mechanism. In addition, the above embodiment is compatible with current secure boot mechanism of existing operating systems.

Figure 3:
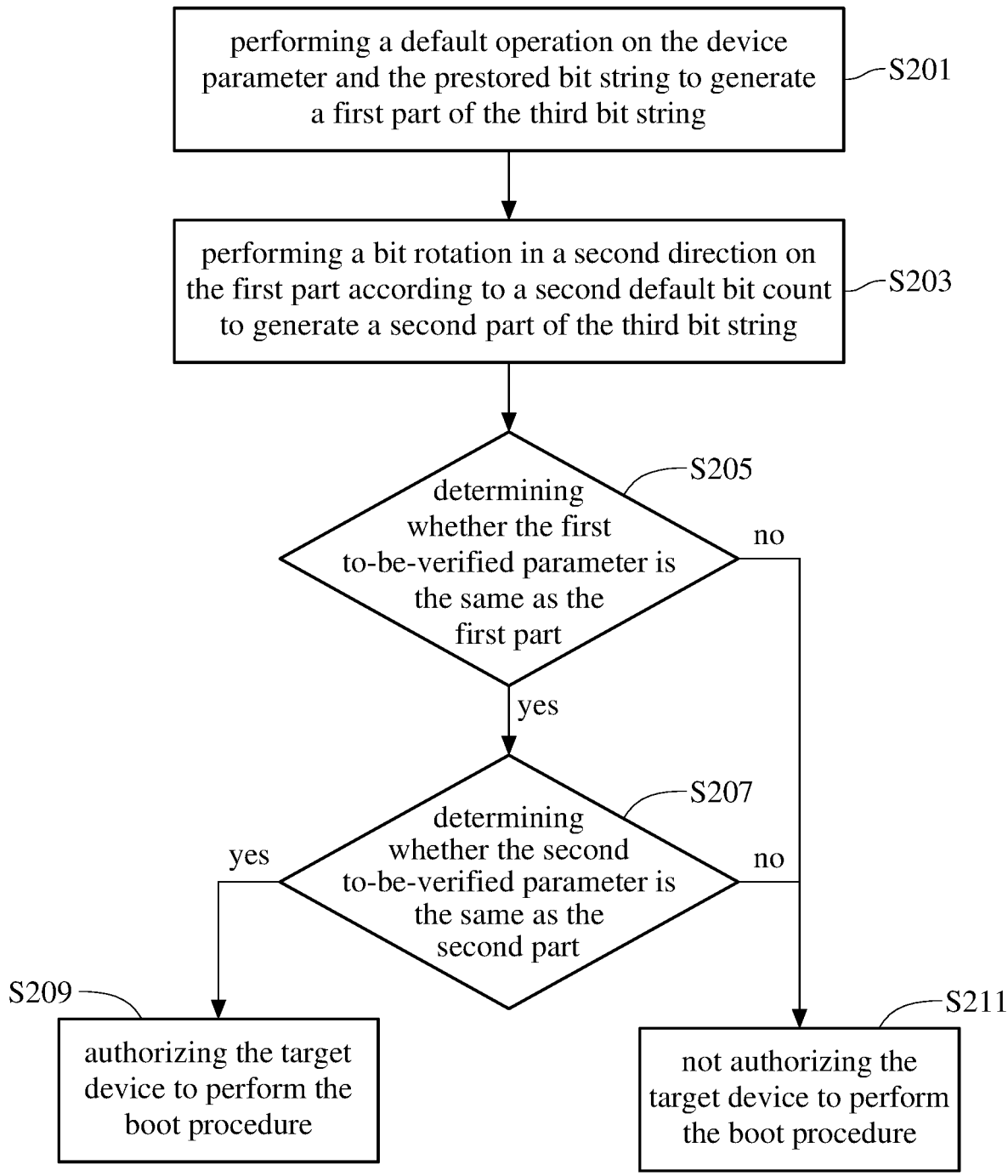
FIG. 3 is a flowchart illustrating a computer boot method according to another embodiment of the present disclosure.

Please refer to FIG. 1 and FIG. 3, wherein FIG. 3 is a flowchart illustrating a computer boot method according to another embodiment of the present disclosure. Steps shown in FIG. 3 may be performed by the processing device 11. It should be noted that in the embodiment of FIG. 3, the second bit string includes a device parameter and the to-be-verified parameter. The to-be-verified parameter includes a first to-be-verified parameter and a second to-be-verified parameter. The device parameter may be data of the processing device that stores the first bit string into the target device TD, such as a time parameter of storing the first bit string, a serial number and/or a sequence number etc.; wherein if the data includes the time parameter, the processing device 11 may further determine whether the first bit string of the target device TD is valid within an authorized period, and the serial number and the sequence number may be formed of any number or letter, the serial number and the sequence number may also be a serial number of the processing device 11 or the target device TD. The device parameter may include one byte or two bytes, and the following descriptions are based on the device parameter including two bytes. Take the second bit string (Y; M; K1; K2) for example, the device parameter may include bytes Y and M, the first to-be-verified parameter may be byte K1, and the second to-be-verified parameter may be byte K2. Further, the second bit string may be formed of 32 bits, the processing device 11 may equally divide the 32 bits into four groups with each one of the groups formed of 8 bits according to the sequence of the 32 bits. Therefore, the processing device 11 may use the 8 bits of the first group as byte of the device parameter; use the 8 bits of the second group as byte M of the device parameter; use the 8 bits of the third group as byte K1; and use the 8 bits of the fourth group as byte K2.

Steps shown in FIG. 3 may be another embodiment of obtaining the third bit string associated with the prestored bit string. The steps include: step S201: performing a default operation on the device parameter and the prestored bit string to generate a first part of the third bit string; step S203: performing a bit rotation in a second direction on the first part according to a second default bit count to generate a second part of the third bit string; step S205: determining whether the first to-be-verified parameter is the same as the first part; if the determination result of step S205 is "yes", performing step S207: determining whether the second to-be-verified parameter is the same as the second part; if the determination result of step S207 is "yes", performing step S209: authorizing the target device to perform the boot procedure; if the determination result of step S205 is "no" or the determination result of step S207 is "no", performing step S211: not authorizing the target device to perform the boot procedure. Step S201 and step S203 of FIG. 3 may be regarded as a detail flowchart of another embodiment of step S105 of FIG. 2. Step S205 and step S207 of FIG. 3 may be regarded as a detail flowchart of another embodiment of step S107 of FIG. 2. In addition, the order of performing step S205 and step S207 may be switched. That is, if step S207 is performed before step S205, the processing device 11 performs step S205 when the determination result of step S207 is "yes".

In step S201, the processing device 11 performs the default operation on the device parameter and the prestored bit string to generate the first part of the third bit string. For example, the default operation may be a default logic operation, and the processing device 11 may perform the default logic operation on the device parameter and the prestored bit string to generate the first part of the third bit string.

In step S203, the processing device 11 performs the bit rotation in the second direction on said first part according to the second default bit count to generate the second part of the third bit string. The second default bit count may be the same as or different from the first default bit count, and the second direction may be the same as or different from the first direction, the present disclosure is not limited thereto.

Take the third bit string (K1b, K2b) described above for example, the first part may be byte K1b, and the second part may be byte K2b. In addition, the bit count of the first part is the same as the bit count of the first to-be-verified parameter, and the bit count of the second part is the same as the bit count of the second to-be-verified parameter.

In step S205 and step S207, the processing device 11 determines whether the first to-be-verified parameter of the second bit string and the first part of the third bit string are the same, and determines whether the first to-be-verified parameter of the second bit string and the first part of the third bit string are the same. If the determination results of both step S205 and step S207 are "yes", the processing device 11 performs step S209; if one of the determination results of step S205 and step S207 is "no", the processing device 11 performs step S211. Step S209 of FIG. 3 and step S109 of FIG. 2 are the same, and step S211 and step S111 of FIG. 2 are the same, their descriptions are not repeated herein.

Figure 4:
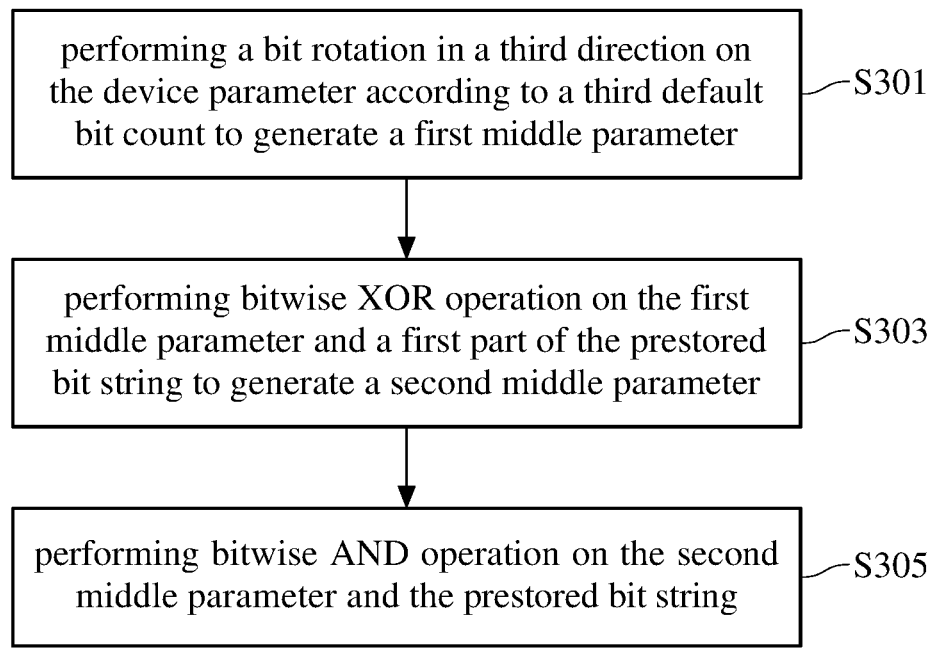
FIG. 4 is a flowchart illustrating a default operation used for generating a part of a bit string according to an embodiment of the present disclosure.

Please refer to FIG. 1 and FIG. 4, wherein FIG. 4 is a flowchart illustrating a default operation used for generating a part of a bit string according to an embodiment of the present disclosure. Steps shown in FIG. 4 may be performed by the processing device 11. FIG. 4 may be regarded as a detail flowchart of an embodiment of the default operation of FIG. 3. In the embodiment of FIG. 4, the device parameter may include one byte. Further, the device parameter may be a time parameter indicated by the real-time clock (RTC) of the processing device 11 when the processing device 11 stores the prestored bit string into the memory device 10. Said time parameter may be obtained according to the RTC of the processing device 11. For example, the device parameter may be year of month obtained according to the real-time clock. Said year and month are only examples, the device parameter may also be other time parameters such as season, quarter, etc.

As shown in FIG. 4, the default operation includes: step S301: performing a bit rotation in a third direction on the device parameter according to a third default bit count to generate a first middle parameter; step S303: performing bitwise XOR operation on the first middle parameter and a first part of the prestored bit string to generate a second middle parameter; and step S305: performing bitwise AND operation on the second middle parameter and the prestored bit string.

In step S301, the processing device 11 performs the bit rotation in the third direction according to the third default bit count on the device parameter to generate the bit-rotated first middle parameter. The third direction may be the same as or different from the first direction, and the third default bit count may be the same as or different from the first default bit count, the present disclosure is not limited thereto.

In step S303, the processing device 11 performs bitwise XOR operation on the first middle parameter and the first part of the prestored bit string to generate the second middle parameter. Specifically, the processing device 11 may compare bits of the first middle parameter and bits of the first part of the prestored bit string respectively. When the compared two bits are the same, the processing device 11 outputs a result of "0", and when the compared two bits are different, the processing device 11 outputs a result of "1". The processing device 11 connects the results sequentially to generate the second middle parameter.

In step S305, the processing device 11 performs bitwise AND operation on the second middle parameter and the second part of the prestored bit string to generate the first part of the third bit string. Specifically, the processing device 11 may compare bits of the second middle parameter and bits of the second part of the prestored bit string respectively. When the compared two bits are the same, the processing device 11 outputs a result of "0", and when the compared two bits are different, the processing device 11 outputs a result of "1". The processing device 11 connects the results sequentially to generate the first part of the third bit string.

For example, the device parameter is 0x23, the first part of the prestored bit string is 0x21, the second part of the prestored bit string is 0x66, the third direction is a right direction, and the third default bit count is 2 bits, then the first middle parameter generated in step S301 is 0xC8; the second middle parameter generated in step S303 is 0xE9; and the first part of the third bit string generated in step S305 is 0x60.

Figure 5:
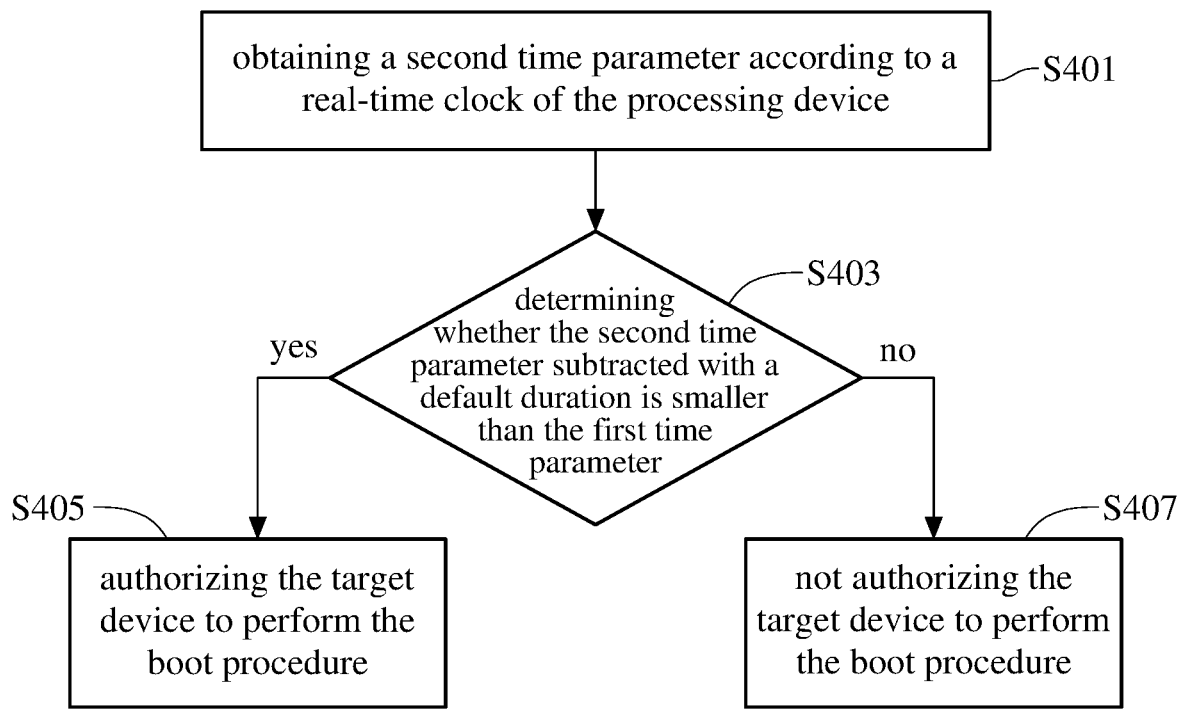
FIG. 5 is a flowchart illustrating a computer boot method according to yet another embodiment of the present disclosure.

Please refer to FIG. 1 and FIG. 5, wherein FIG. 5 is a flowchart illustrating a computer boot method according to yet another embodiment of the present disclosure. Steps shown in FIG. 5 may be performed by the processing device 11, and may be performed after step S103 of FIG. 2 and before step S109 of FIG. 2. In the embodiment of FIG. 5, the second bit string further includes a first time parameter (Y; M). The first time parameter may be the time of the processing device 11 storing the prestored bit string into the memory device 10. The time parameter may be obtained from the RTC of the processing device 11. For example, the first time parameter may be one or both of year and month indicated by the RTC.

As shown in FIG. 5, before step S109 of FIG. 2, the processing device 11 may be further configured to perform: step S401: obtaining a second time parameter according to a real-time clock of the processing device; step S403: determining whether the second time parameter subtracted with a default duration is smaller than the first time parameter; if the determination result of step S403 is "yes", performing step S405: authorizing the target device to perform the boot procedure; and if the determination result of step S403 is "no", performing step S407: not authorizing the target device to perform the boot procedure.

In step S401, the processing device 11 obtains the second time parameter according to the RTC of the processing device 11. The time unit of the second time parameter is the same as the time unit of the first time parameter. The difference between the first time parameter and the second time parameter is that, the first time parameter is a predefined time limit, and the second time parameter is a time parameter indicating current time of obtaining the second bit string.

In step S403, the processing device 11 subtracts the default duration from the second time parameter, and determines whether the second time parameter subtracted with the default duration is smaller (earlier) than the first time parameter, wherein the default duration may be 1 month, 2 months, etc., the present disclosure is not limited thereto. In other words, in step S403, the processing device 11 determines whether the second time parameter is within a period of validity corresponding to the prestored bit string (i.e. earlier than the first time parameter). For example, the first time parameter (Y; M) is 0x23 and 0x03, the default duration is 2 months, if the second time parameter (Y; M) is 0x23 and 0x04, then the second time parameter subtracted with the default duration is 0x23 and 0x01, which is smaller (earlier) than the first time parameter, and thus the processing device 11 performing step S405.

If the determination result of step S403 is "yes", the processing device 11 performs step S405; if the determination result of step S403 is "no", the processing device 11 performs step S407. Step S405 of FIG. 5 is the same as step S109 of FIG. 2, and step S407 of FIG. 5 is the same as step S111 of FIG. 2, their descriptions are not repeated herein.

The operation example of the computer boot method and system according to one or more embodiments described above is described below. In the embodiment of determining whether to authorize the target device as the boot device performing the boot procedure (FIG. 1 to FIG. 5), the processing device performs: reading the first bit string from the target device which is assumed to be (0x8C; 0x0D; 0x80; 0x30); performing the bit rotation in the first direction according to the first default bit count on the first bit string to generate the second bit string (0x23; 0x03; 0x60; 0x0C), wherein the first byte and/or the second byte in the second bit string may be used as the device parameter, the third byte may be used as the first to-be-verified parameter, and the fourth byte may be used as the second to-be-verified parameter; performing the bit rotation in the third direction according to the third default bit count on the device parameter to generate the first middle parameter (0xC8); performing bitwise XOR operation on the first middle parameter and the first part of the prestored bit string (0x21) to generate the second middle parameter (0xE9); performing bitwise AND operation on the second middle parameter and the second part of the prestored bit string (0x66) to generate the first part of the third bit string (0x60); performing the bit rotation in the second direction according to the second default bit count on the first part to generate the second part of the third bit string (0x0C); and determining whether the first to-be-verified parameter (0x60) of the second bit string and the first part (0x60) of the third bit string are the same, and determining whether the second to-be-verified parameter (0x0C) of the second bit string and the second part (0x0C) of the third bit string are the same, thereby determining whether to authorize the target device to perform the boot procedure.

The computer boot method and system according to one or more embodiments of the present disclosure may be applied to computer systems such as automated teller machine (ATM), point of sale (POS) etc., the computer boot method and system according to one or more embodiments of the present disclosure may also be applied to computer systems in homes and offices, the present disclosure is not limited thereto. Take ATM for example, a central server managing one or more ATMs may be configured to generate an authorized bit string and store the authorized bit string into said one or more ATMs to simplify the step of storing the authorized bit string to multiple ATMs respectively, wherein the details of the authorized bit string are described below with reference to embodiment of FIG. 7. When, for example, a maintenance engineer connects a portable storage device (the target device) to an ATM, before the ATM starts operation, the processing device at the ATM end (for example, the processing device disposed in the ATM) may perform one or more embodiments of FIG. 1 to FIG. 5 to obtain the second bit string and the third bit string, and runs the boot procedure in the portable storage device when determining that the to-be-verified parameter of the second bit string matches with the third bit string; on the contrary, if the portable storage device is not authorized, the processing device runs the existing boot procedure in the ATM. In addition, take the application scenario of an office as an example, a central server managing one or more office computers may be configured to generate an authorized bit string and store the authorized bit string into said one or more office computers. When an office computer needs to be connected to a USB drive to boot through the internal system of the USB drive, the processing device at the office computer end (for example, the processing device disposed in the office computer) may perform one or more embodiments of FIG. 1 to FIG. 5 to obtain the second bit string and the third bit string, and runs the boot procedure through the USB drive when determining that the to-be-verified parameter of the second bit string matches with the third bit string.

Figure 6A:
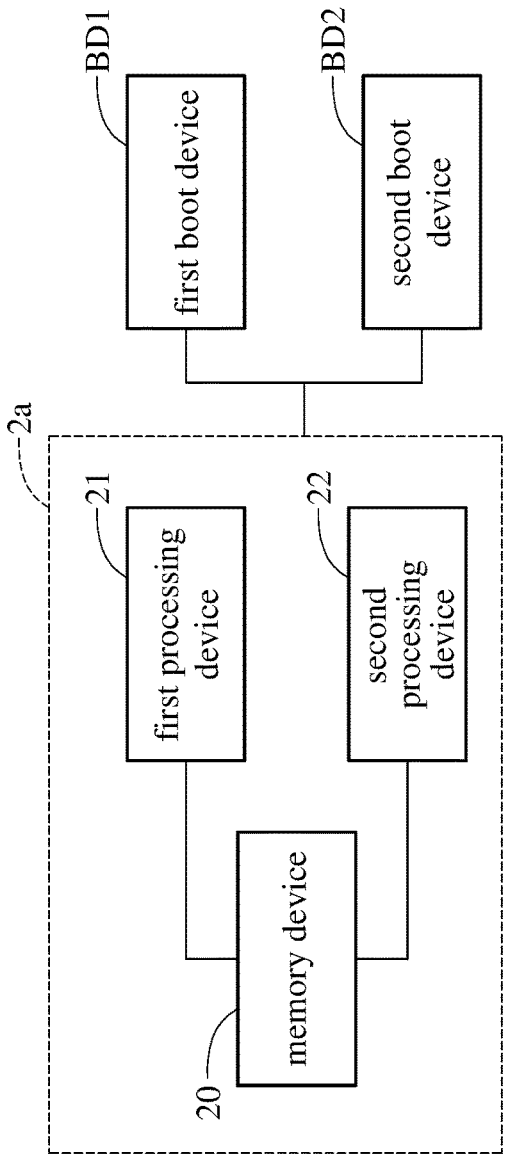
FIG. 6(*a*) and FIG. 6(*b*) are block diagrams respectively illustrating a computer boot system and a target device according to another embodiment and yet another embodiment of the present disclosure.

Please refer to FIG. 6(a), wherein FIG. 6(a) is a block diagram illustrating the computer boot system and the boot device according to another embodiment of the present disclosure. As shown in FIG. 6(a), the computer boot system 2a according to another embodiment of the present disclosure includes a memory device 20, a first processing device 21 and a second processing device 22. The memory device 20 is electrically connected to or in communication connection with the first processing device 21 and the second processing device 22. The memory device 20 and the first processing device 21 in FIG. 6(a) are the same as the memory device 10 and the processing device 11 in FIG. 1. The second processing device 22 may include one or more processors, said processor is, for example, a central processing unit, a graphics processing unit, a microcontroller, a programmable logic controller or any other processor with signal processing function. In FIG. 6(a), the first processing device 21 and the second processing device 22 are electrically connected to or in communication connection with a first boot device BD1 and a second boot device BD2. FIG. 6(a) exemplarily shows two boot devices BD1 and BD2, the number of the boot device may also be one or more than two, the present disclosure is not limited thereto.

In FIG. 6(a), one of the first processing device 21 and the second processing device 22 may be used as the central server managing the ATMs or office computers as described above, and the other may be used as the processing device at the ATM end or the processing device at the office computer end; the memory device 20 may be the memory device at the central server managing the ATMs or office computers for storing the prestored bit string; the first boot device BD1 and the second boot device BD2 may be the portable storage device or the USB drive as described above. In this structure, the processing device at the central server end and the processing device at the ATM end/office computer end access the same memory device 20 for the processing device at the central server end to obtain the authorized bit string according to the prestored bit string stored in the memory device 20, and for the processing device at the ATM end/office computer end to obtain the third bit string according to the prestored bit string stored in the memory device 20.

Figure 6B:
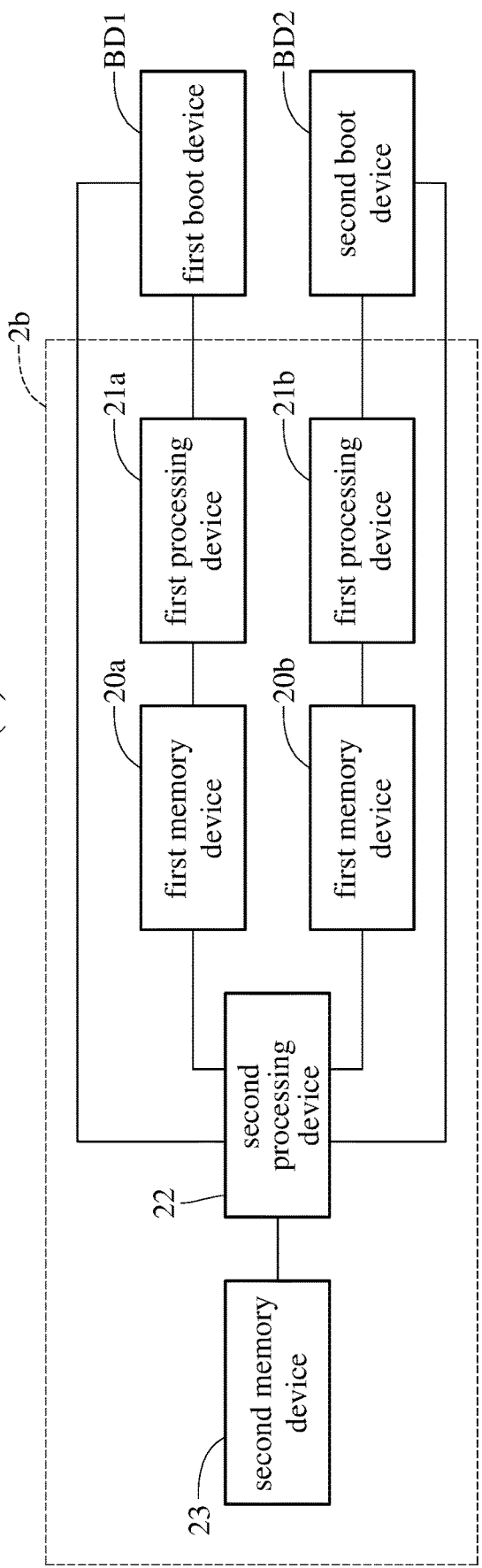

Please refer to FIG. 6(b), wherein FIG. 6(b) is a block diagram illustrating the computer boot system and the boot device according to yet another embodiment of the present disclosure. As shown in FIG. 6(b), the computer boot system 2b according to yet another embodiment of the present disclosure includes first memory devices 20a and 20b, first processing devices 21a and 21b, a second processing device 22 and a second memory device 23. The first memory devices 20a and 20b are electrically connected to or in communication connection with the first processing devices 21a and 21b respectively, the second processing device 22 is electrically connected to or in communication connection with the second memory device 23, the first memory devices 20a and 20b. in FIG. 6(b), the first processing devices 21a and 21b and the second processing device 22 are electrically connected to or in communication connection with the first boot device BD1 and the second boot device BD2 respectively. The first memory devices 20a and 20b and the first processing devices 21a and 21b in FIG. 6(b) are the same as the memory device 10 and the processing device 11 in FIG. 1 respectively, their descriptions are not repeated herein. The second processing device 22 may include one or more processors, said processor is, for example, a central processing unit, a graphics processing unit, a microcontroller, a programmable logic controller or any other processor with signal processing function. In the embodiment of FIG. 6(b), the second processing device 22 stores the prestored bit string into the first memory devices 20a and 20b for the first processing devices 21a and 21b to respectively perform the computer boot method according to one or more embodiments described with reference to FIG. 1 to FIG. 5. FIG. 6(b) exemplarily shows two boot devices BD1 and BD2, the number of the boot device may be one or more than two, the present disclosure is not limited thereto.

In FIG. 6(b), the first processing devices 21a and 21b may be used as the processing devices at the ATM end or office computer end as described above; the first memory devices 20a and 20b may be used as the memory devices at the ATM end or office computer end as described above for storing the prestored bit string; the second processing device 22 may be used as the central server for managing the ATMs or office computers; the second memory device 23 may be used as the memory device at the central server end; the first boot device BD1 and the second boot device BD2 may be the portable storage devices or USB drives. In this structure, the processing device at the central server end and the processing device at the ATM end/office computer end access different memory devices. The central server end obtains the authorized bit string according to the prestored bit string stored in the second memory device 23, and the processing device at the ATM end/office computer end obtains the third bit string according to the prestored bit string stored in the first memory devices 20a and 20b, wherein the prestored bit string stored in the first memory devices 20a and 20b and the prestored bit string stored in the second memory device 23 might be the same.

Embodiments of FIG. 1 to FIG. 5 describe determining whether the target device is an authorized device when the computer system reads the target device before booting to determine whether to authorize the target device to be the boot device for performing the boot procedure. Embodiments of FIG. 7 and FIG. 8 describe storing bit string into the authorized boot device for the computer system to perform the computer boot method as described in one or more embodiments of FIG. 1 to FIG. 5. The embodiment of storing the bit string into the authorized boot device may be performed by the first processing devices 21, 21a, 21b or the second processing device 22. More specifically, the second processing device 22 and the memory device 20 in FIG. 6(a) and the second processing device 22 and the second memory device 23 in FIG. 6(b) may be configured to perform storing the authorized bit string into the authorized boot device as described below and perform determining whether to authorize the target device to perform the boot procedure as described above. Alternatively, the second processing device 22 and the memory device 20 in FIG. 6(a) and the second processing device 22 and the second memory device 23 in FIG. 6(b) may be configured to perform storing the authorized bit string into the authorized boot device as described below, and the first processing device 21 and the memory device 20 in FIG. 6(a) and the first processing devices 21a and 21b and the first memory devices 20a and 20b in FIG. 6(b) may be configured to perform determining whether to authorize the target device to perform the boot procedure as described above. In other words, the first processing device and the first memory device in FIG. 6(a) and FIG. 6(b) may be disposed at local user end, and the second processing device and the second memory device may be disposed at the central server end. For illustration convenience, the following embodiments are described based on the second processing device 22.

Figure 7:
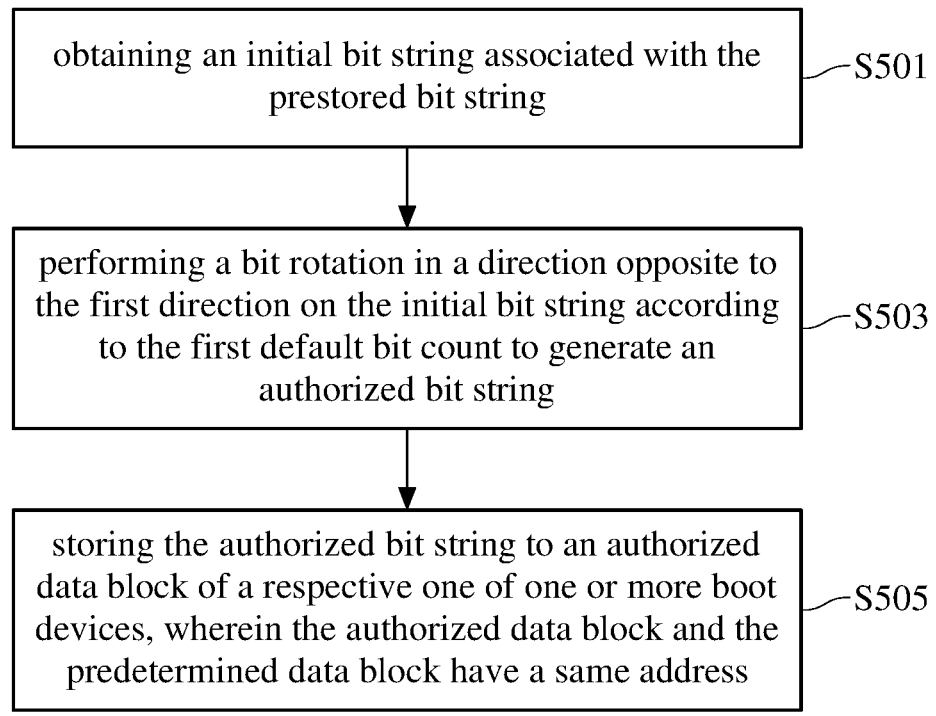
FIG. 7 is a flowchart illustrating a method of generating an authorized bit string of a boot device according to an embodiment of the present disclosure.

Please refer to FIG. 6(a), FIG. 6(b) and FIG. 7, wherein FIG. 7 is a flowchart illustrating a method of generating an authorized bit string of a boot device according to an embodiment of the present disclosure. Steps shown in FIG. 7 are performed before the first processing device 21 reading the first bit string (step S101 of FIG. 2), and may be performed by the second processing device 22. As shown in FIG. 7, the method of generating the authorized bit string of the boot device includes: step S501: obtaining an initial bit string associated with the prestored bit string; step S503: performing a bit rotation in a direction opposite to the first direction on the initial bit string according to the first default bit count to generate an authorized bit string; and step S505: storing the authorized bit string to an authorized data block of a respective one of one or more boot devices, wherein the authorized data block and the predetermined data block have a same address. Steps shown in FIG. 7 may also be performed by the first processing device 21.

In step S501, the second processing device 22 obtains the initial bit string associated with the prestored bit string. The initial bit string may be the prestored bit string or may be a bit string obtained by the second processing device 22 performing the default operation on the prestored bit string. For example, the second processing device 22 may obtain data such as random value generated by the second processing device 22, a value by performing weighting operation on the random value or serial number of the second processing device 22 etc., and transform one or more pieces of the data into default byte format, the present disclosure is not limited thereto.

In step S503, the second processing device 22 performs the bit rotation in a direction opposite to the first direction according to the first default bit count on the first bit string to generate the bit-rotated authorized bit string.

In step S505, the second processing device 22 stores the authorized bit string into the authorized data block of the first boot device BD1 and the authorized data block of the second boot device BD2. The authorized data blocks are idle blocks in the first boot device BD1 and the second boot device BD2. The predetermined data block and the authorized data blocks may have the same address, such as blocks from bit 0x1B4 to bit 0x1B7.

For example, corresponding to the embodiments of FIG. 1 to FIG. 5, if the second bit string obtained according to the target device by the first processing device 21 matches with the third bit string, it means that the prestored bit string corresponding to the third bit string and the prestored bit string used for generating the authorized bit string are the same. Therefore, the first processing device 21 may authorize the target device to perform the boot procedure. In other words, if the determination result of step S107 of FIG. 2 is "yes", it means that the target device is one of the first boot device BD1 and the second boot device BD2; on the contrary, if the determination result of step S107 of FIG. 2 is "no", it means that the target device is not the first boot device BD1 and the second boot device BD2.

Figure 8:
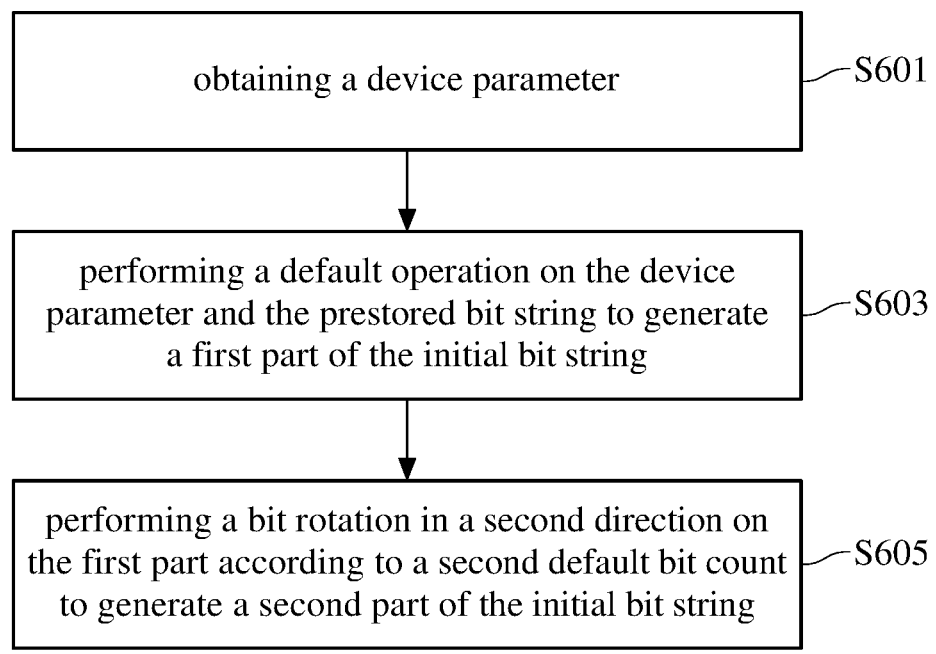
FIG. 8 is a flowchart illustrating a method of obtaining an initial bit string for generating the authorized bit string according to an embodiment of the present disclosure.

Please refer to FIG. 6(a), FIG. 6(b) and FIG. 8, wherein FIG. 8 is a flowchart illustrating a method of obtaining an initial bit string for generating the authorized bit string according to an embodiment of the present disclosure. Steps shown in FIG. 8 may be performed by the second processing device 22 and may be regarded as a detail flowchart of an embodiment of step S501 of FIG. 7. As shown in FIG. 8, the method of obtaining the initial bit string includes: step S601: obtaining a device parameter; step S603: performing a default operation on the device parameter and the prestored bit string to generate a first part of the initial bit string; and step S605: performing a bit rotation in a second direction on the first part according to a second default bit count to generate a second part of the initial bit string. Steps shown in FIG. 8 may also be performed by the first processing device 21.

In step S601, the second processing device 22 obtains the device parameter of the second processing device 22. The device parameter may be data of the second processing device 22, such as the time of storing the prestored bit string into the memory devices 20/20a/20b/23, serial number, sequence number of the second processing device 22, etc. The device parameter may include one byte or two bytes.

In step S603, the second processing device 22 performs the default operation on the device parameter and the prestored bit string to generate a first part of the initial bit string. For example, the default operation may be a default logic operation, the second processing device 22 may perform the default logic operation on the device parameter and the prestored bit string to generate the first part of the initial bit string.

In step S605, the second processing device 22 performs the bit rotation in the second direction according to the second default bit count on the first part of the initial bit string to generate the second part of the initial bit string. The second default bit count may be the same as the first default bit count, the second direction may be the same as the first direction, the present disclosure is not limited thereto.

Method of performing step S603 and step S605 may be the same as that of step S201 and step S203 in FIG. 3. In other words, the operation, direction of bit rotation and bit count used for generating the initial bit string are the same as the operation, direction of bit rotation and bit count used for generating the third bit string.

Further, the device parameter described in step S601 may include one byte. Further, the device parameter may be the time of the second processing device 22 storing the prestored bit string into the memory device 20. The time parameter may be obtained from the RTC of the second processing device 22.

The default operation described in step S603 may include: performing a bit rotation in the first direction on the device parameter according to the third default bit count to generate a first middle parameter; performing bitwise XOR operation on the first middle parameter and the first part of the prestored bit string to generate a second middle parameter; and performing bitwise AND operation on the second middle parameter and the prestored bit string. The default operation described in step S603 may be implemented by the same method as steps shown in FIG. 4, their descriptions are not repeated herein.

The operation example of the computer boot method and system according to one or more embodiments described above is described below, wherein the first part of the prestored bit string is 0x21 and the second part of the prestored bit string is 0x66. In the embodiment of storing bit string into the authorized boot device (FIG. 7 and FIG. 8), meaning the embodiment of using the target device as the boot device performing the boot procedure, the processing device performs: obtaining year Y (0x23) and month M (0x03) currently indicated by the RTC as a first sub parameter and a second sub parameter of the device parameter respectively; performing the bit rotation in the right direction (the first direction) with 2 bits (the third default bit count) on the first sub parameter to generate the first middle parameter (0xC8); performing bitwise XOR operation on the first middle parameter and the first part of the prestored bit string (0x21) to generate the second middle parameter (0xE9); performing bitwise AND operation on the second middle parameter and the second part of the prestored bit string (0x66) to generate the first part (0x60) of the initial bit string; performing the bit rotation in the left direction (the second direction) with 3 bits (the second default bit count) on the first part to generate the second part (0x0C) of the initial bit string; and performing the bit rotation in an opposite direction to the first direction with 2 bits (the first default bit count) on the first sub parameter, the second sub parameter and the initial bit string to generate the authorized first bit string (0x8C; 0x0D; 0x80; 0x30) and storing the authorized first bit string into one or more boot devices. The first default bit count, the second default bit count and the third default bit count may be the same as or different from each other, the default bit count may be set according to default setting of the bit rotation in the system; the first direction, the second direction and the third direction may be the same as or different from each other, and the rotation direction may be set according to default setting of the bit rotation in the system, the present disclosure is not limited thereto.

In addition, the processing device may first enter BIOS setting to activate security device and add security identification number (ID), then perform steps of storing bit string into the authorized boot device.

It should be noted that the above examples are described based on hexadecimal byte, but said byte may also be based binary system, diad system or octal system etc. In addition, when the embodiments are not based on binary system, the method of the processing device performing the bit rotation may be first converting the bytes into binary system, then performing bit rotation, and then converting the bit-rotated byte into the original system.

In view of the above description, the computer boot method and system according to one or more embodiments of the present disclosure may allow the target device performing the boot procedure after confirming that the target device is the previously authorized boot device, thereby avoiding virus infection occurs on the computer system as well as avoiding data leak of the computer system. Therefore, only the authorized boot device may activate boot mechanism. In addition, the above embodiment is compatible with current secure boot mechanism of existing operating systems.

What is claimed is:

1. A computer boot method, performed by a processing device, comprising:
reading a first bit string in a predetermined data block from a target device;
performing a bit rotation in a first direction on the first bit string according to a first default bit count to generate a second bit string;
obtaining a third bit string associated with a prestored bit string;
determining whether a to-be-verified parameter of the second bit string matches the third bit string;
authorizing the target device to perform a boot procedure when the to-be-verified parameter of the second bit string matches the third bit string; and
not authorizing the target device to perform the boot procedure when the to-be-verified parameter of the second bit string does not match the third bit string.

2. The computer boot method according to claim 1, wherein the second bit string further comprises a device parameter, the to-be-verified parameter comprises a first to-be-verified parameter and a second to-be-verified parameter, and obtaining the third bit string associated with the prestored bit string comprises:
performing a default operation on the device parameter and the prestored bit string to generate a first part of the third bit string; and
performing a bit rotation in a second direction on the first part according to a second default bit count to generate a second part of the third bit string;
wherein determining whether the to-be-verified parameter of the second bit string matches the third bit string comprises:
determining whether the first to-be-verified parameter is the same as the first part; and
determining whether the second to-be-verified parameter is the same as the second part.

3. The computer boot method according to claim 2, wherein the default operation comprises:
performing a bit rotation in a third direction on the device parameter according to a third default bit count to generate a first middle parameter;
performing bitwise XOR operation on the first middle parameter and a first part of the prestored bit string to generate a second middle parameter; and
performing bitwise AND operation on the second middle parameter and the second part of the prestored bit string.

4. The computer boot method according to claim 1, wherein the second bit string comprises a first time parameter, and the method further comprises:
obtaining a second time parameter according to a real-time clock of the processing device; and
determining whether the second time parameter subtracted with a default duration is smaller than the first time parameter,
wherein authorizing the target device to perform the boot procedure is performed when the second time parameter minus the default duration is smaller than the first time parameter.

5. The computer boot method according to claim 1, wherein before the processing device reading the first bit string from the target device, the method further comprises, steps performed by the processing device or another processing device, and the steps comprise:
obtaining an initial bit string associated with the prestored bit string;
performing a bit rotation in a direction opposite to the first direction on the initial bit string according to the first default bit count to generate an authorized bit string; and
storing the authorized bit string to an authorized data block of a respective one of one or more boot devices, wherein the authorized data block and the predetermined data block have a same address.

6. The computer boot method according to claim 5, wherein obtaining the initial bit string associated with the prestored bit string comprises:
obtaining a device parameter;
performing a default operation on the device parameter and the prestored bit string to generate a first part of the initial bit string; and performing a bit rotation in a second direction on the first part according to a second default bit count to generate a second part of the initial bit string.

7. The computer boot method according to claim 6, wherein the default operation comprises:
   performing a bit rotation in the first direction on the device parameter according to a third default bit count to generate a first middle parameter;
   performing bitwise XOR operation on the first middle parameter and a first part of the prestored bit string to generate a second middle parameter; and
   performing bitwise AND operation on the second middle parameter and the prestored bit string.

8. A computer boot system comprising:
   a memory device configured to store a prestored bit string and a plurality of commands; and
   a processing device connected to the memory device and configured to read the plurality of commands to perform:
      reading a first bit string in a predetermined data block from a target device;
      performing a bit rotation in a first direction on the first bit string according to a first default bit count to generate a second bit string;
      obtaining a third bit string associated with the prestored bit string;
      determining whether a to-be-verified parameter of the second bit string matches the third bit string;
      authorizing the target device to perform a boot procedure when the to-be-verified parameter of the second bit string matches the third bit string; and
      not authorizing the target device to perform the boot procedure when the to-be-verified parameter of the second bit string does not match the third bit string.

9. The computer boot system according to claim 8, wherein the second bit string further comprises a device parameter, the to-be-verified parameter comprises a first to-be-verified parameter and a second to-be-verified parameter, and the processing device obtaining the third bit string associated with the prestored bit string comprises:
   performing a default operation on the device parameter and the prestored bit string to generate a first part of the third bit string; and
   performing a bit rotation in a second direction on the first part according to a second default bit count to generate a second part of the third bit string;
   wherein determining whether the to-be-verified parameter of the second bit string matches the third bit string comprises:
   determining whether the first to-be-verified parameter is the same as the first part; and
   determining whether the second to-be-verified parameter is the same as the second part.

10. The computer boot system according to claim 9, wherein the default operation comprises:
    performing a bit rotation in a third direction on the device parameter according to a third default bit count to generate a first middle parameter;
    performing bitwise XOR operation on the first middle parameter and a first part of the prestored bit string to generate a second middle parameter; and
    performing bitwise AND operation on the second middle parameter and the prestored bit string.

11. The computer boot system according to claim 8, wherein the second bit string comprises a first time parameter, and the processing device is further configured to perform:

obtaining a second time parameter according to a real-time clock of the processing device; and
determining whether the second time parameter minus a default duration is smaller than the first time parameter,
wherein authorizing the target device to perform the boot procedure is performed when the second time parameter minus the default duration is smaller than the first time parameter.

12. The computer boot system according to claim 8, wherein the processing device is further configured to perform:
    obtaining an initial bit string associated with the prestored bit string;
    performing a bit rotation in a direction opposite to the first direction on the initial bit string according to the first default bit count to generate an authorized bit string; and
    storing the authorized bit string to an authorized data block of a respective one of one or more boot devices, wherein the authorized data block and the predetermined data block have a same address.

13. The computer boot system according to claim 8, further comprising another processing device and another memory device, the another memory device configured to store the prestored bit string, and before the processing device reading the first bit string from the target device, the another processing device configured to perform:
    obtaining an initial bit string associated with the prestored bit string;
    performing a bit rotation in a direction opposite to the first direction on the initial bit string according to the first default bit count to generate an authorized bit string; and
    storing the authorized bit string to an authorized data block of a respective one of one or more boot devices, wherein the authorized data block and the predetermined data block have a same address.

14. The computer boot system according to claim 12, wherein the processing device performing obtaining the initial bit string associated with the prestored bit string comprises:
    obtaining a device parameter;
    performing a default operation on the device parameter and the prestored bit string to generate a first part of the initial bit string; and
    performing a bit rotation in a second direction on the first part according to a second default bit count to generate a second part of the initial bit string.

15. The computer boot system according to claim 13, wherein the another processing device performing obtaining the initial bit string associated with the prestored bit string comprises:
    obtaining a device parameter;
    performing a default operation on the device parameter and the prestored bit string to generate a first part of the initial bit string; and
    performing a bit rotation in a second direction on the first part according to a second default bit count to generate a second part of the initial bit string.

16. The computer boot system according to claim 14, wherein the default operation comprises:
    performing a bit rotation in the first direction on the device parameter according to a third default bit count to generate a first middle parameter;
    performing bitwise XOR operation on the first middle parameter and a first part of the prestored bit string to generate a second middle parameter; and performing bitwise AND operation on the second middle parameter and the prestored bit string.

* * * * *